(12) United States Patent
Fritze (10) Patent No.: US 6,953,526 B1
(45) Date of Patent: Oct. 11, 2005

(54) FILTER ASSEMBLY

(75) Inventor: Karl Fritze, Denmark Township, MN (US)

(73) Assignee: CUNO Incorporated, Meriden, CT (US)

( * ) Notice: Subject to any disclaimer, the term of this patent is extended or adjusted under 35 U.S.C. 154(b) by 0 days.

(21) Appl. No.: 09/618,686

(22) Filed: Jul. 18, 2000

Related U.S. Application Data (60) Provisional application No. 60/191,259, filed on Mar. 22, 2000.

(51) Int. Cl.$^7$ ............................................. B01D 35/157
(52) U.S. Cl. ........................ 210/234; 210/418; 210/444
(58) Field of Search ................................ 210/232, 234, 210/235, 249, 418, 438, 440, 443, 444, DIG. 17; 251/149.5, 149.6, 333, 337; 137/543.23; 285/21.1, 423, 332.3, 334.1, 334.3

(56) References Cited

U.S. PATENT DOCUMENTS

| | | | |
|---|---|---|---|
| 2,338,291 A | | 1/1944 | McIntosh |
| 2,991,885 A | | 7/1961 | Gutkowski |
| 3,191,905 A | * | 6/1965 | Brown ..................... 251/149.5 |
| 3,529,515 A | | 9/1970 | Lang |
| 3,583,667 A | * | 6/1971 | Amneus, Jr. ............. 251/149.5 |
| 3,914,176 A | | 10/1975 | Holmes |
| 4,006,752 A | | 2/1977 | De Vale |
| 4,173,362 A | * | 11/1979 | Glover et al. ............... 277/625 |
| 4,396,512 A | | 8/1983 | Beauman |
| 4,437,499 A | | 3/1984 | Devale |
| 4,440,200 A | | 4/1984 | DeVale |
| 4,529,514 A | | 7/1985 | Gruett |
| 4,548,227 A | | 10/1985 | Regunathan |
| 4,556,484 A | | 12/1985 | Hunter |
| 4,594,361 A | | 6/1986 | Beauman |
| 4,645,601 A | | 2/1987 | Regunathan |
| 4,654,142 A | | 3/1987 | Thomsen |
| 4,725,354 A | | 2/1988 | Thomsen |
| 4,735,716 A | | 4/1988 | Petrucci |

(Continued)

FOREIGN PATENT DOCUMENTS

| | | |
|---|---|---|
| DE | 1134659 | 8/1962 |
| DE | 3429634 | 2/1986 |
| JP | 14914 | 1/1985 |

Primary Examiner—Matthew O. Savage
(74) Attorney, Agent, or Firm—R. Thomas Payne; John A. Tomich; John F. Thuente (57) ABSTRACT

A filter assembly for filtering water from an external source, the filter assembly including a manifold assembly mountable to an appliance and being in fluid communication with the external source and a cartridge assembly, the cartridge assembly being replaceably fluidly couplable to the manifold assembly, the filter assembly includes a first and a second fluid tube, the first fluid tube being fluidly couplable to the external source being an unfiltered fluid inlet, the second fluid tube being a filtered fluid outlet, the first and the second fluid tubes each having a barbed end for coupling to the manifold assembly. A tube retainer assembly is associated with each of the first and second fluid tubes, the tube retainer assemblies each having a port being fixedly couplable to the manifold assembly, the port having a retainer bore defined therein for receiving a tube barbed end therein, a retainer ring disposable on the tube, the retainer ring compressively engaging a barbed surface of the tube barbed end and being fixedly bondable to the port for forming a fluid tight seal between the fluid tube and the retainer assembly. A cartridge assembly and a method of disengaging the cartridge assembly from a manifold assembly are also included.

7 Claims, 9 Drawing Sheets

U.S. PATENT DOCUMENTS

| | | |
|---|---|---|
| 4,759,474 A | 7/1988 | Regunathan |
| 4,770,770 A | 9/1988 | Regunathan |
| 4,857,189 A | 8/1989 | Thomsen |
| 4,904,382 A | 2/1990 | Thomsen |
| 4,956,086 A | 9/1990 | Thomsen |
| 5,087,083 A * | 2/1992 | Usui et al. ................ 285/286 |
| RE34,031 E | 8/1992 | Thomsen |
| RE34,050 E | 9/1992 | Thomsen |
| 5,164,085 A | 11/1992 | Spokoiny |
| 5,486,288 A * | 1/1996 | Stanford et al. ............ 210/235 |
| 5,527,470 A | 6/1996 | Suda |
| 5,573,279 A * | 11/1996 | Rea et al. .................. 285/21.1 |
| 5,653,871 A | 8/1997 | Thomsen |
| 5,753,107 A * | 5/1998 | Magnusson et al. ........ 210/109 |
| 5,833,849 A | 11/1998 | Primdahl |
| 6,360,764 B1 * | 3/2002 | Fritze ...................... 137/15.01 |

* cited by examiner

FILTER ASSEMBLY

RELATED APPLICATION

The present application claims the benefit of U.S. Provisional Application No. 60/191,259 filed Mar. 22, 2000, which is incorporated herein in its entirety by reference.

TECHNICAL FIELD

The present invention relates to filter assemblies for filtering drinking water. More particularly, the present invention relates to a filter assembly that is provided as an integral component of an appliance, such as a refrigerator.

BACKGROUND OF THE INVENTION

Filter assemblies that are provided as components of appliances are known in the industry. Nonetheless, there continues to be a need for filter assemblies that satisfy some of the deficiencies of the prior art filter assemblies. New filter assemblies should have increased effective life of the components of the filter assembly that actually do the water filtration. Further, since the cartridge of the filter assembly must be periodically replaced, there is a need to make the cartridge assembly as easily manufactured and as cost effective as possible. With respect to the manifold assembly that supports the cartridge assembly, where components require joining a maximum number of such components that convey water should preferably be joined by welding in order to minimize the possibility of possible leaks.

SUMMARY OF THE INVENTION

The filter assembly of the present invention substantially meets the aforementioned needs of the industry. A cartridge assembly that is a component of the filter assembly of the present invention includes a primary filtration device that is slidably disposed within a sleeve. The sleeve acts as a prefilter filtering out many components that would otherwise reduce the effective life of the primary filtration device. Additionally, by slidably disposing the primary filtration device within the sleeve a plurality of different manufacturing sources may be utilized for the sleeve and the primary filtration device with the selected sleeve and primary filtration device being married up late in the final assembly process. Additionally, flexibility is gained by providing for a plurality of different sleeve constrictions that may be readily adapted to the cartridge assembly in order to meet any unique specifications of the end user.

In order to minimize leaks, extensive use of plastic welding techniques, including sonic welding, spin welding, hot plate welding, and electromagnetic assembly (EMA) and other such techniques are employed in conjunction with the water conveying components of the cartridge assembly. Additionally, hot melt type glue is utilized to fuse various components together as well as to create water tight seals in order to force the water being filtered through both the sleeve and the primary filtration device.

The various components comprising the manifold assembly of the filter assembly of the present invention also make substantial use of plastic welding techniques in order to minimize the manual coupling of various water conveying components. Such manual coupling is typically prone to leakage and, being manual, contribute to increased production cost.

A critical aspect of the manifold assembly of the filter assembly of the present invention is that, during replacement of cartridge assemblies on the manifold assembly, the water under pressure being supplied to the manifold assembly be automatically and positively shutoff, so that there is no spillage when the cartridge assembly is removed from the manifold assembly. Accordingly, a high flow, positive closing valve is disposed in the manifold assembly to ensure reliable shutoff as well to ensure a high rate of flow of water to be filtered into the manifold assembly when the cartridge assembly is mated thereto.

The present invention is a filter assembly for filtering water from an external source, the filter assembly including a manifold assembly mountable to an appliance and being in fluid communication with the external source and a cartridge assembly, the cartridge assembly being replaceably fluidly couplable to the manifold assembly, the filter assembly includes a first and a second fluid tube, the first fluid tube being fluidly couplable to the external source being an unfiltered fluid inlet, the second fluid tube being a filtered fluid outlet, the first and the second fluid tubes each having a barbed end for coupling to the manifold assembly. A tube retainer assembly is associated with each of the first and second fluid tubes, the tube retainer assemblies each having a port being fixedly couplable to the manifold assembly, the port having a retainer bore defined therein for receiving a tube barbed end therein, a retainer ring disposable on the tube, the retainer ring compressively engaging a barbed surface of the tube barbed end and being fixedly bondable to the port for forming a fluid tight seal between the fluid tube and the retainer assembly. The present invention is further a cartridge assembly and additionally a method of disengaging the cartridge assembly from a manifold assembly are also included.

BRIEF DESCRIPTION OF THE DRAWINGS

FIG. 4a is a side elevational sectional view of the barb;

DETAILED DESCRIPTION OF THE DRAWINGS

The filter assembly of the present invention is shown generally at 10 in the figures. The filter assembly 10 has two major components: manifold assembly 12 and cartridge assembly 14.

Figure 15:
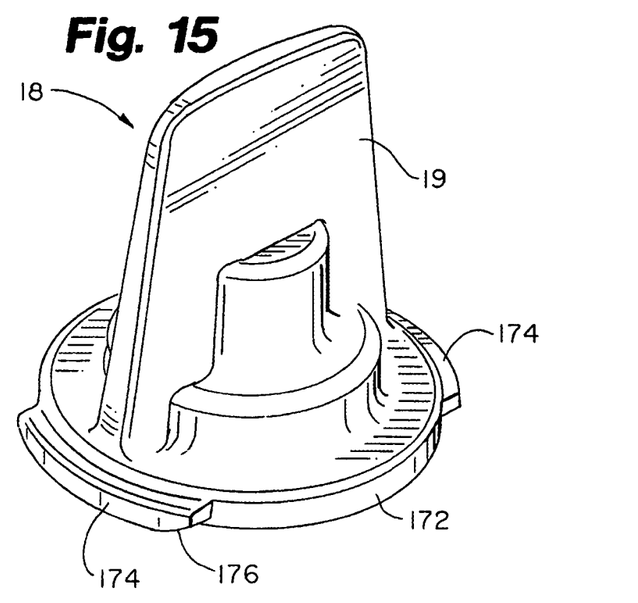
FIG. 15 is a perspective view of an embodiment of the bypass cap.
Figure 16:
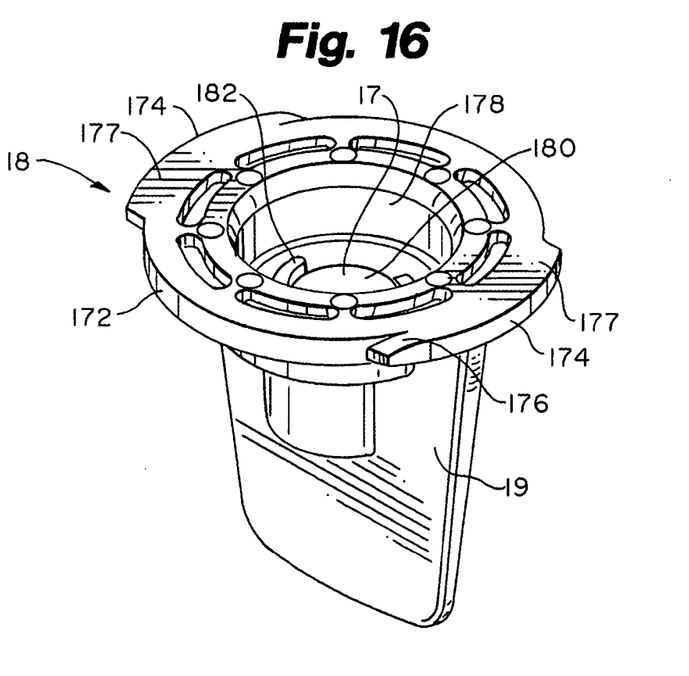
FIG. 16 is an inverted perspective view of the bypass cap of FIG. 15.

The manifold assembly 12 includes two subcomponents: housing 16 and bypass cap 18. It should be noted that bypass cap 18 (see in particular FIGS. 1, 15, and 16) is provided to the end user coupled to the housing 16 prior to installation of a cartridge assembly 14 of the present invention. The bypass cap 18 permits water to pass through the manifold assembly 12 without filtration by flowing through a sealed bore 17 defined in the bypass cap 18. Accordingly, the valve 90 (described in detail below) is held in the open disposition by the bypass cap 18 when in engagement with the manifold assembly 12. Typically, the bypass cap 18 is removed by the end user prior to installation of a cartridge assembly 14 and may then be discarded or may be reinstalled in the event that no filtration is desired. The bypass cap is installed and removed by gripping the handle 19 and rotating the bypass cap 18 relative to the manifold assembly 12. Many of the features of the bypass cap 18 that enable the bypass cap 18 to sealingly engage the manifold assembly 12 are similar to the corresponding features of the cartridge assembly 14, as is detailed below, and are so numbered.

Figure 1:
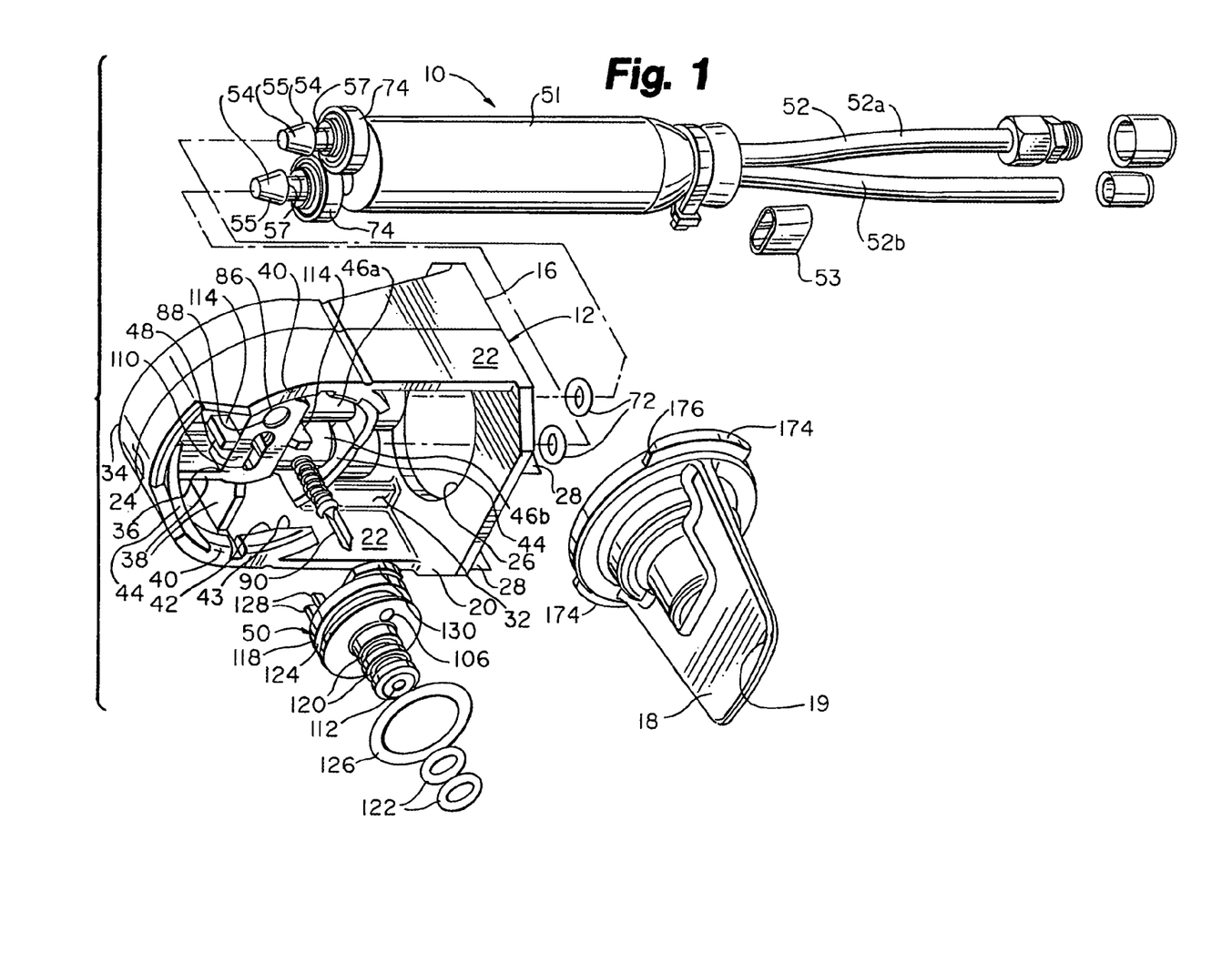
FIG. 1 is an exploded perspective view of the manifold assembly of the filter assembly of the present invention.

The housing 16 of the manifold assembly 12 includes a backing plate 20, side arms 22, and a cartridge receiver 24. The backing plate 20 has a center bore 26 defined therein that accommodates the passage of inlet and outlet fluid tubes therethrough. The backing plate 20 is designed to be mated to the appliance of which the filter assembly 10 will be a component. Accordingly, rearward directed outwardly projecting hooks 28 are provided proximate the upper margin of the backing plate 20. The hooks 28 may be inserted behind a plate on the appliance and the manifold assembly made fast thereto by the insertion of threaded fasteners through a pair of bores 30 defined in the backing plate 20 proximate the lower margin thereof.

The side arms 22 of the housing 16 are formed integral with the backing plate 20 and extend generally parallel to one another in an orthogonal disposition relative to the backing plate 20. Each of the side arms has an inward directed gusset 32 that extends between the backing plate 20 and the cartridge receiver 24 to strengthen the coupling between the backing plate 20 and the cartridge receiver 24.

The cartridge receiver 24 is generally cylindrical in shape having a diameter that is essentially equal to the spacing between the outer margin of the side arms 22 such that the side arms 22 end at a point tangential to the cartridge receiver 24. The cartridge receiver 24 generally has a peripheral ring 34 and a center fluid inlet/outlet 36. The center fluid inlet/outlet 36 is supported by support arms 38 extending between the inner margin of the peripheral ring 34 and the center fluid inlet/outlet 36.

The peripheral ring 34 has a pair of diametrically opposed inward directed lugs 40. Each of the lugs 40 has a lower margin surface, as depicted in FIG. 1, that comprises a ramped bearing surface 42. The ramp 43 of a first ramped bearing surface 42 is diametrically opposed to the ramp 43 of a second ramped bearing surface 42. As will be seen, the cartridge assembly 14 is rotatably mated to the manifold assembly 12 by first engaging the ramp 43 and then riding on the ramp 43 to engage the ramped bearing surface 42.

A pair of diametrically opposed kick off ramps 44 are disposed at the opposite end of the respective lug 40 from the ramp 43. The kick off ramps 44 extend upward to fair into the top margin of the respective lug 40. As will be seen, the kick off ramps 44 provide for a smooth rotatable disengagement of the cartridge assembly 14 from the manifold assembly 12. The use of the kick off ramps 44 permits the user that is removing a cartridge assembly 14 to gradually and smoothly overcome the sealing friction that exists as a result of the o-ring seals 122, 126, described in detail below so that the cartridge assembly is removed without a jerking motion as is otherwise felt when the sealing friction is released suddenly.

The inlet/outlet 36 of the cartridge receiver 24 includes a pair of side-by-side fluid ports 46, fluid port 46a being the water inlet and tube assembly 46b being the water outlet. The fluid ports 46 are coupled to the base assembly 48. The base assembly 48 is in turn fixedly coupled, preferably by plastic welding techniques indicated above, to the cartridge insert 50.

Figures 2, 3:
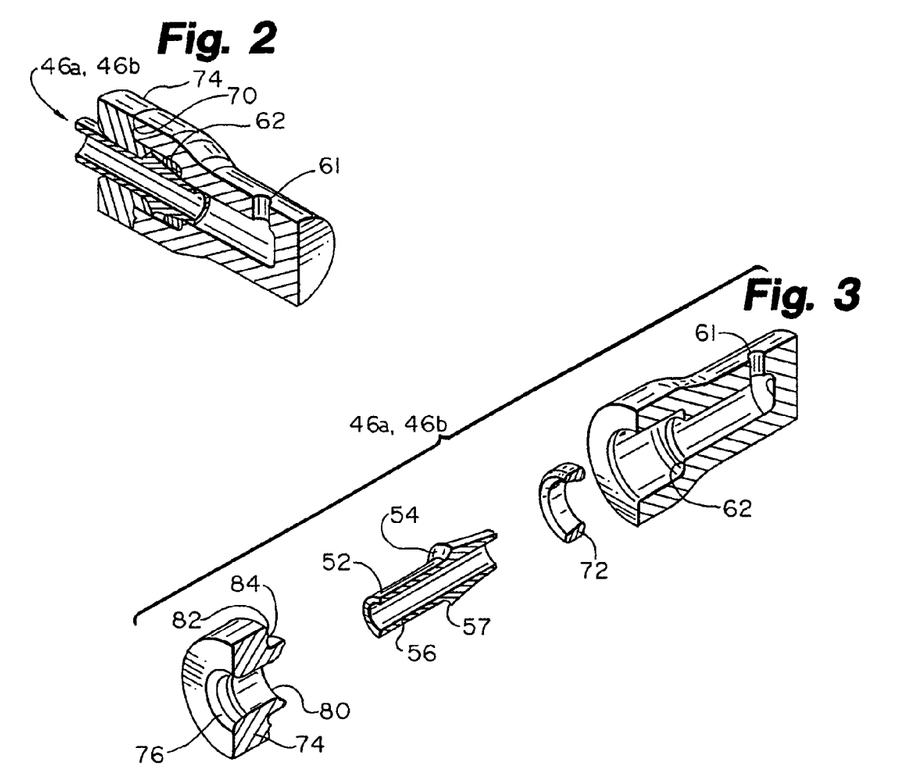
FIG. 2 is a sectional perspective view of a fluid port of the manifold assembly.
FIG. 3 is an exploded perspective view of the fluid port.
Figure 4:
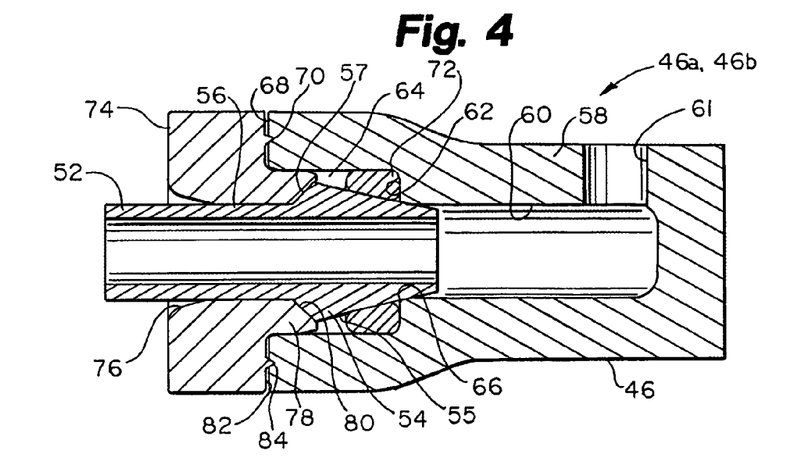
FIG. 4 is a side elevational sectional view of the fluid port.

Referring to FIGS. 2–4, the fluid port 46 (both fluid ports 46a, 46b are identical) includes a barbed tube 52. The barbed tube 52 may be as much as eight feet in length to accommodate the plumbing in the particular appliance in which the filer assembly 10 is to be incorporated. The pair of barbed tubes 52 may have an insulating plug 51 disposed proximate the end of the barbed tubes 52 that is inserted into the port 58 and is used to insulatingly plug the appliance tube opening. The exterior diameter of the insulating cover 51 is sized such that it comfortably fits within the center bore 26 defined in the backing plate 20. In order to stabilize the two barbed tubes 52, a tie 53 may be disposed thereon proximate the insulating cover 51. The tie 53 provides a relatively small lead-in diameter to more easily insert the insulating cover 51 into the aperture in the appliance. The tie 53 further acts as a retainer holding the insulating cover 51 in place.

A first one of the barbed tubes 52 (tube 52a) is preferably coupled to a source of unfiltered water. A second one of the barbed tubes 52 (tube 52b) is fluidly coupled to components of the appliance that make use of the filtered water, such as a spigot for drawing a glass of chilled water or an ice making device. A barb 54 is formed in the tube wall 56 of the barbed tube 52 proximate the end of the barbed tube 52 that is coupled to the manifold assembly 12. The barb 54 presents a ramp face 55 adjoined to a barbed face 57. The barbed tube 52 is sealingly coupled to port 58.

The port 58 has a axial bore 60 defined in part therethrough. The bore 60 is fluidly coupled to a fluid passage 61 extending through the wall of the port 58. In the depiction of FIGS. 2–4, the fluid passage 61 is upward directed. The fluid passage 61 could as well be formed in the closed end of the port 58. A step 62 is formed bore 60 to define an expanded bore 64. A step edge 66 defines the inner margin of the step 62. The port 58 has a generally circular bonding margin 68. An elastomeric seal 72, which is preferably an O-ring, may be disposed within the expanded bore 64 of the port 58. In the depiction of FIG. 3, the seal 72 is shown in its compressed form after being incorporated in the port 46. Prior to such incorporation, the seal 72 has a generally circular cross section. Alternatively, the seal 72 could be overmolded on the retainer 58 in substantially the same location as depicted in FIGS. 2 and 4. In this embodiment, the seal 72 is integral with the retainer 58.

A retainer ring 74 is slidably disposed on the barbed tube 52. The retainer ring 74 has an axial retainer ring bore 76 defined therethrough. The bore 76 has a flared opening 76a to aid in preventing kinks in the tubes 52 where the tubes 52 enter the port 46. The inside diameter of the retainer ring bore 76 is slightly greater than the outside diameter of the barbed tube 52 in order to provide for sliding engagement therewith. A plurality of spaced apart crush ribs 77 oriented generally parallel to the longitudinal axis of the bore 76 may be formed in the bore 76. The crush ribs 77 acts to frictionally hold the retainer ring 74 in a pre-weld or pre-bond disposition to ensure proper positioning for the best weld or adhesive bonding. The retainer ring 74 has a tapered shoulder 78 that is disposed closest to the barb 54. The tapered shoulder 78 has a tapered face 80. The retainer ring 74 further has a generally circular bonding margin 82. A raised energy deflector 84 is defined on the bonding margin 82.

In assembly, the elastomeric seal 72 is disposed within the expanded bore 64 of the port 58. This first step is obviated in the event that the seal 72 is overmolded integral with barbed tube 52 as depicted in FIG. 4a.

The retainer ring 74 is then slid further forward on the barbed tube 52 until the tapered shoulder 78 projects into the expanded bore 64. The tapered shoulder 78 of the retainer 74 compressibly engages the barbed face 57 of the barbed tube 52 and the energy deflector 84 of the retainer ring 74 projects toward the the bonding margin 68 of the port 58.

In the aforementioned disposition, sonic welding is applied to the fluid port 56 and the energy deflector 84 ensures a securely welded bond of the bonding margin 82 of the retainer ring 74 to the bonding margin 68 of the port 58. In such manner, the barbed tubes 52 are fixedly, sealingly coupled to the manifold assembly 12. It should be noted that the bonding margin 68 may be textured to improve the weld strength.

The base assembly 48 of the inlet/outlet 36 is seen in FIG. 1. The base assembly 48 has a downward directed fluid inlet 86, in the orientation the filter assembly 10 is usually in when mounted to the appliance. The fluid inlet 86 defines a valve well 88 for disposition of the high flow valve 90 therein.

Figure 5:
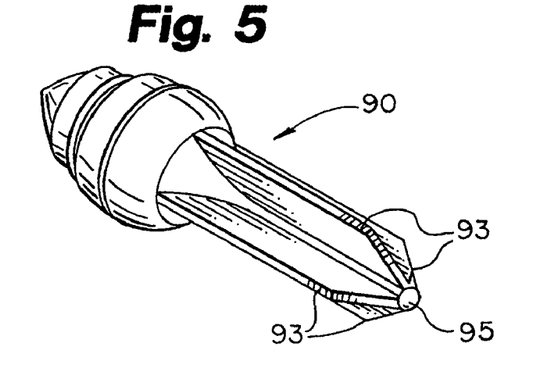
FIG. 5 is a perspective view of a high flow valve taken from the fluted end thereof.
Figure 6:
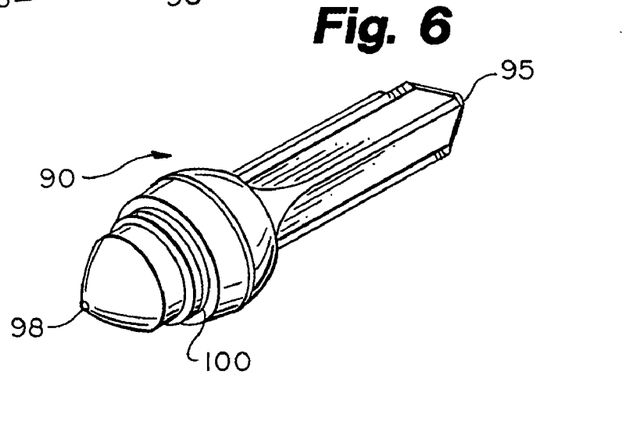
FIG. 6 is a perspective view of the high flow valve taken from the nose end thereof.
Figure 7:
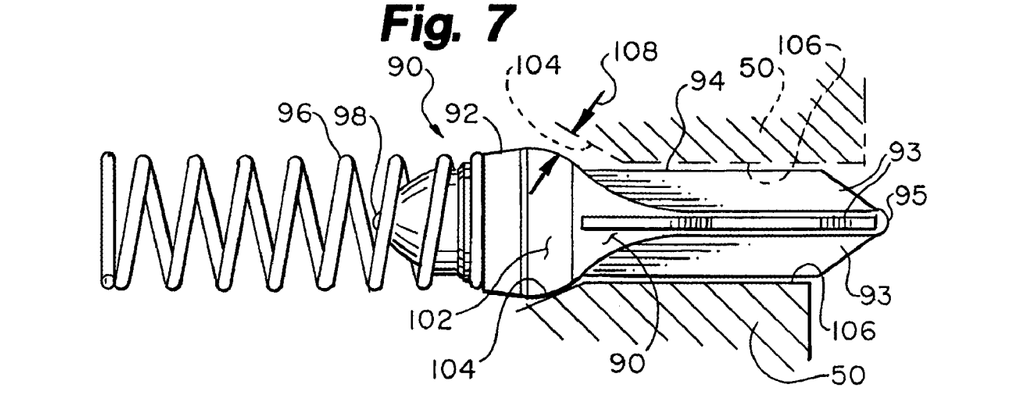
FIG. 7 is a side elevational view of the high flow valve in both the closed and open dispositions.

Details of the construction of the high flow valve 90 may be had with reference to FIGS. 5–7. The high flow valve 90 has an efficient hydrodynamic shape to ensure a high rate of flow when the valve 90 is in the open disposition. Further, as will be seen, the fluted shaft 94 of the high flow valve 90 ensures both a high rate of flow thereby and further acts to maintain the axial alignment of the high flow valve 90 with respect to the bore defined in the cartridge insert 50 within which the high flow valve 90 resides.

The high flow valve 90 has a valve body 91, the valve body 91 having a head 92 tapering to the fluted shaft 94. In a preferred embodiment, the flutes of the fluted shaft 94 are defined between four equal angularly spaced flute walls 93. In practice, one of the flute walls 93 may be thicker than the others in order to assist in mold ejection. The tip of the fluted shaft 94 defines a bearing surface 95. A compression coil spring 96 is disposed at the opposite end of the high flow valve 90 from the bearing surface 95. Several coils of the spring 96 spiral around the nose 98 of the high flow valve 90. The first coil of the spring 96 is retained within a spring retainer groove 100 defined between the nose 98 and the head 92 of the high flow valve 90. The circumferential seal 102 is disposed around the waist of the head 92. In a preferred embodiment, the seal 102 is integrally molded by an injection over molding of thermal plastic rubber material subsequent to formation of the body of the high flow valve 90. The seal 102 eliminates the need for use of an O-ring with the high flow valve 90. The exterior shape of the seal 102 continues the curved shape of the head 92 and contributes to the hydrodynamic efficiency of the high flow valve 90. In the past, the use of an O-ring seal provided a substantial impediment to the flow of water around the valve. By forming the valve body 91 of a material that is not affected by the form of plastic welding used to weld the cartridge insert 50 to the base 48, the valve 90 may reside in the well 86 during welding without being affected by the welding operation. For example, the valve body 91 may be formed of polypropylene and the base 48 may be formed of ABS in the event that sonic welding is used.

In operation, the nose 98 and spring 96 of the high flow valve 90 reside within the well 88. The fluted shaft 94 of the high flow valve 90 resides the inlet bore 106 defined in the cartridge insert 50 (see FIG. 1). The inlet bore 106 has seat 104 defined therein. In the closed disposition of the high flow valve 90, the seal 102 bears on the seat 104 under the biasing effect of the spring 96 in cooperation with the pressure exerted by the incoming water to be filtered. In the closed disposition, the high flow 90 prevents the flow of tap water through the manifold assembly 12.

When a cartridge assembly 14 is rotatably engaged with the manifold assembly 12, the bearing surface 95 is acted on to force the high flow valve 90 leftward as depicted in FIG. 7. Such translation of the high flow valve causes the seal 102 to unseat from the seal 104 as indicated in phantom on the upper portion of FIG. 7. The unseating of the high flow valve 90 opens a fluid passage 108 between the inlet bore 106 and the high flow vial 90. Incoming water to be filtered then flows around the head 92 and through the flutes defined by the flute walls 93. The outer margin of the flute walls 93 have a dimension measured diametrically from flute wall 93 to the opposed flute wall 93 that is only slightly less than the inside diameter of the inlet bore 106. Accordingly, the exterior margin of the flute walls 93 can bear on the wall of the inlet bore 106 to maintain very close axial alignment of the high flow valve 90 with the axis of the inlet bore 106. Such alignment ensures that the bearing surface 95 is adequately engaged to open the high flow valve 90 and to maintain the valve 90 in an aligned open disposition. It should be noted that at all times when the cartridge assembly 14 is rotatably engaged with the manifold assembly 12, the high flow valve 90 is maintained in an open disposition.

Returning to FIG. 1, the base assembly 48 of the inlet/outlet 36 has a fluid outlet 110 disposed adjacent to the fluid inlet 86. The fluid outlet 110 has a lateral dimension such that at its rightmost extremity, the fluid outlet 110 is fluidly coupled to the outlet fluid port 46b and at its leftmost extremity, the fluid outlet 110 is fluidly coupled to the outlet axial bore 112 defined in the cartridge insert 50. The base assembly 48 further has two spaced apart mounting flanges 114.

The cartridge insert 50 is fixedly coupable to the base 48. The cartridge insert 50 has an insert body comprised of a shaft 116 fixedly coupled to a boss 1118. The exterior margin of the shaft 116 has a pair of spaced apart grooves 120 defined therein. Preferably, a seal 122, which may be an O-ring (or may be overmolded and thereby formed integrally in the grooves 120) is disposed in each of the grooves 120. The boss 118 has a further groove 124 defined in the exterior surface margin thereof. Preferably, an O-ring 126 is disposed in the groove 124. Two pairs of downwardly directed, diametrically opposed tabs 128 depend from the boss 1118. A pair of outwardly directed shoulders 130 are disposed at approximately 90 degrees from the respective pairs of tabs 128.

In assembly, the cartridge insert 50 is pressed onto the base assembly 48. Such action causes each of the pairs of tabs 128 to embrace a respective mounting flange 114. Further, the shoulders 130 rest on the upper margin of the base 48. With the high flow valve 90 disposed in the well 88, the fluted shaft 94 now resides within the inlet bore 106 of the cartridge insert 50. In this disposition, the cartridge insert 50 may be bonded, as by sonically welding or other suitable bonding means, to the base 48.

Figure 8:
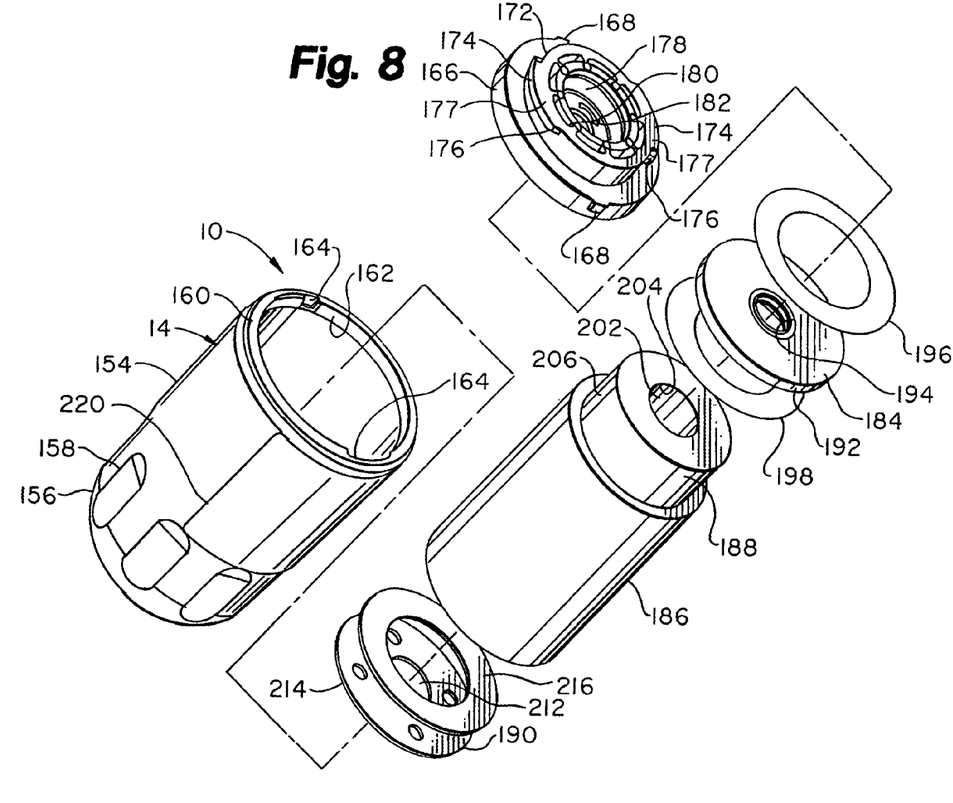
FIG. 8 is an exploded perspective view of the cartridge assembly of the filter assembly of the present invention.
Figure 9:
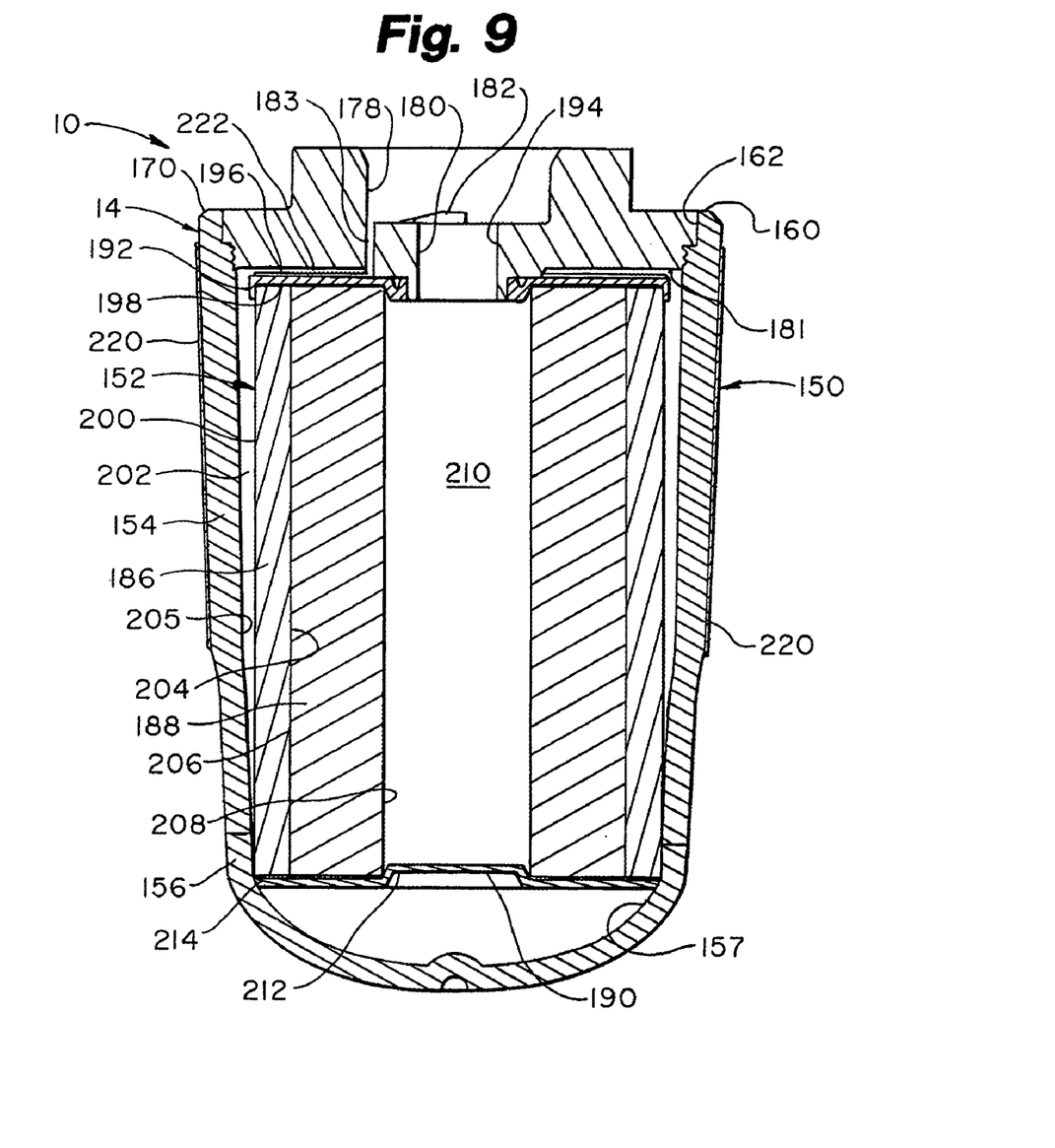
FIG. 9 is a sectional elevational view of the cartridge assembly.
Figure 10:
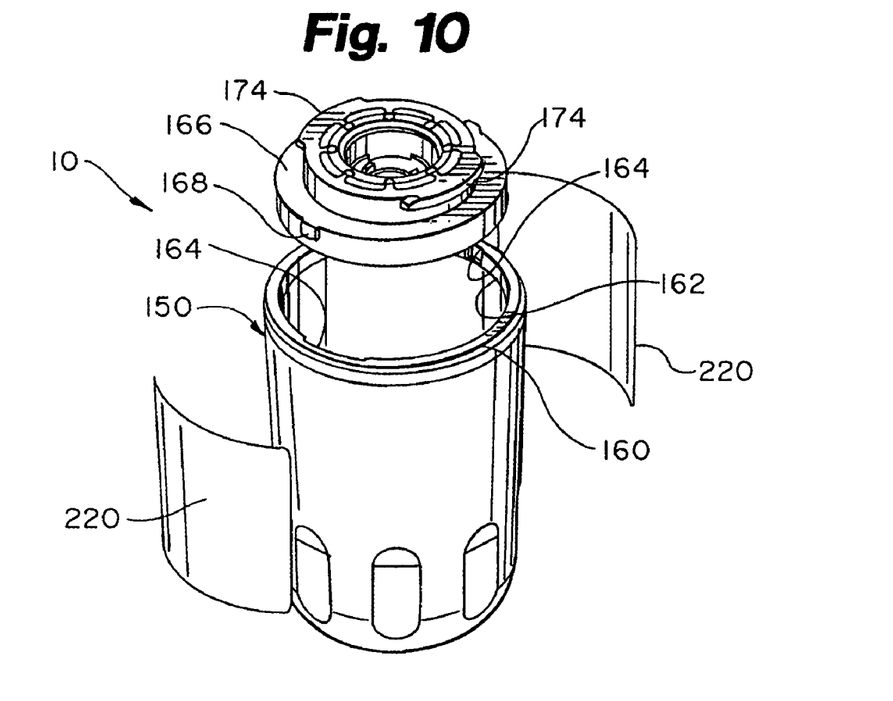
FIG. 10 is a perspective view of the housing assembly of the cartridge assembly.

The cartridge assembly 14 is the second of the major components of the filter assembly 10. Reference may be had to FIGS. 8–10 for the details of the cartridge assembly 14. The cartridge assembly 14 has two major subcomponents: housing assembly 150 and interiorly disposed filtration assembly 152.

The housing assembly 150 has a generally cylindrical barrel 154 that is closed at a first end by a rounded end 156. To the barrel 154 and the rounded end 156 may be formed as a single component or may be formed as two separate components bonded together, as depicted in FIG. 9. The rounded end 156 has a radiused inner surface 157. A plurality of indents 158 may extend around the circumference of the housing assembly 150 to facilitate grasping the cartridge assembly 14 and for providing decoration.

The barrel 154 has an upper margin 160. The inside margin 162 of the margin 160 defines an opening to the interior of the housing assembly 150. A pair of diametrically spaced apart pockets 164 are defined in the upper margin 160. As will be seen, pockets 164 comprise in part a means for aligning graphics disposed on the outer surface of the cartridge assembly 14 to the mounting shoulders 174.

An end cap 166 is disposable within the opening defined by the inside margin 162 of the upper margin 160. In a preferred embodiment, the end cap 166 is sonically shear welded at the intersection of the inside margin 162 of the barrel 150 and the outside margin 170 of the end cap 166. In order to dispose the end cap 166 within the inside margin 162, a pair of diametrically opposed decorator lugs 180 defined on the outside margin 170 are aligned with and inserted into the pockets 164. Spin and EMA welding are alternate means of fixing the end cap 166 at the intersection of the inside margin 162 and the outside margin 170 of the end cap 166.

The end cap 166 has a generally cylindrical boss 172 formed thereon. A pair of diametrically opposed outwardly directed shoulders 174 extend from the outside circumferential margin of the boss 172. The shoulders 174 are designed to rotatably mate with and be retained by the ramped bearing surfaces 42 and the interior margin of the peripheral ring 34 of the cartridge receiver 24. Accordingly, the shoulders 174 have lower margins that comprise ramped bearing surfaces 176 designed for compressive engagement with the ramped bearing surfaces 42. Additionally, the shoulders 174 have a generally planar upper surface that comprises a kick off surface 177. The kickoff surface 177 is designed for engagement with the kick off ramps 44 during disengagement of the cartridge assembly 14 from the manifold assembly 12.

Figure 10A:
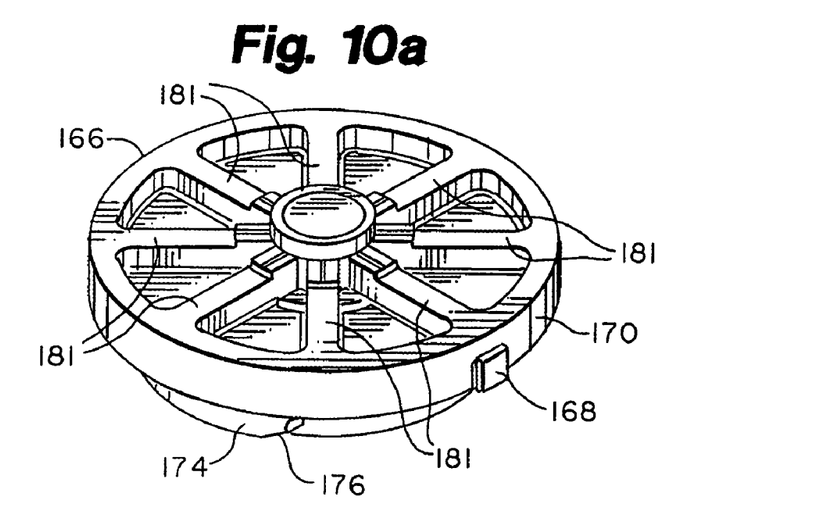
FIG. 10a is a perspective view of the underside of the end cap.
Figure 11:
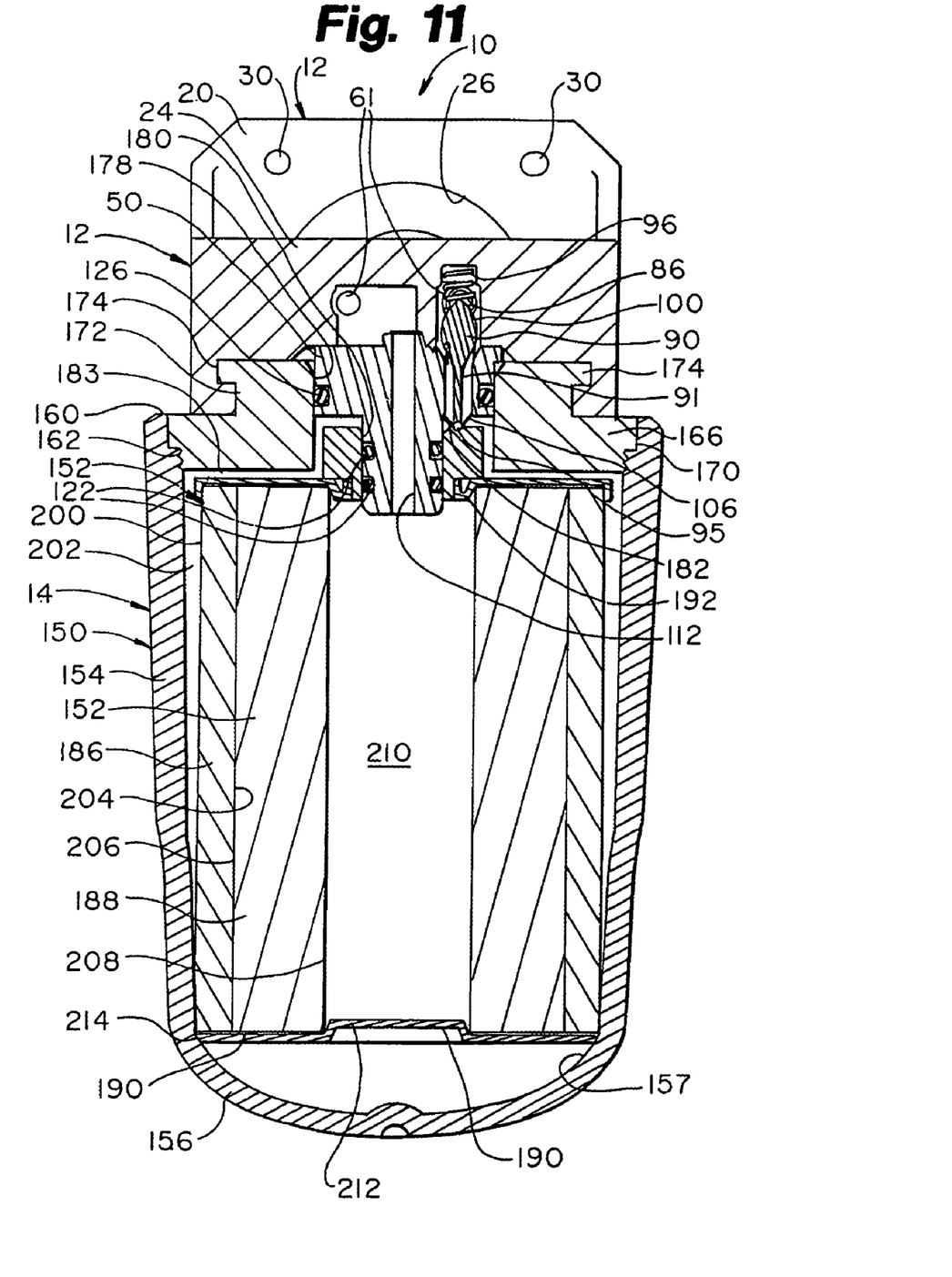
FIG. 11 is a front sectional elevational view of the filter assembly of the present invention.
Figure 12:
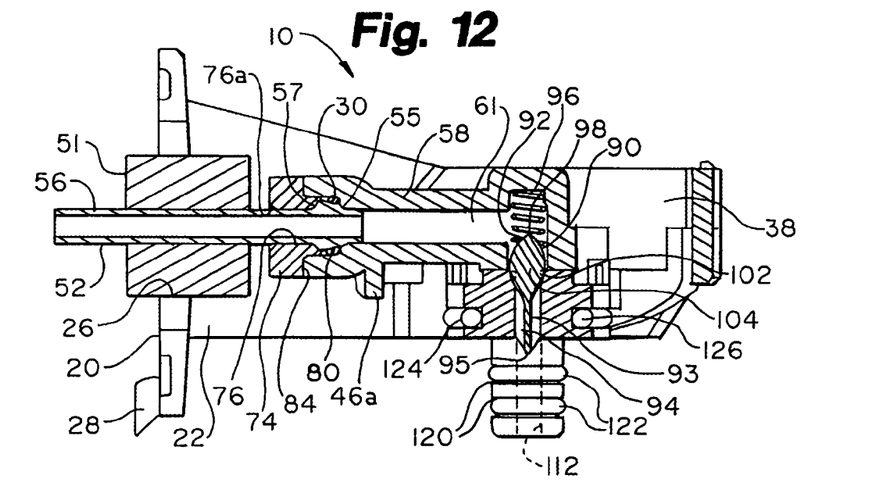
FIG. 12 is a side sectional elevational view of the manifold assembly of the filter assembly of the present invention.

The end cap 166 has a first inner margin 178 defined therein. The first inner margin 178 defines a bore having a relatively large diameter. The diameter of the first inner margin 178 is slightly greater than the outside diameter of the boss 118 of the cartridge insert 50. A second inner margin 180 extends downward from the first inner margin 178. The second inner margin 180 has a somewhat reduced diameter as compared to the first inner margin 178 to define a relatively small bore. The diameter of the second inner margin 180 is slightly greater than the outside diameter of the shaft 16 of the cartridge insert 50. Accordingly, cartridge insert 50 is readily insertable into the end cap 166.

A pair of spaced apart, valve ramps 182 are disposed on the lower margin of the first inner margin 178 adjacent to the second inner margin 180. Regardless of the orientation of the cartridge assembly 14 when it is inserted into the manifold assembly 12, one of the two valve ramps 182 will contact bearing surface 95 of the high flow valve 90 as the cartridge assembly 14 is rotatably engaged with the manifold assembly 12. Such engagement with the bearing surface 95 acts to open the high flow valve 90. An inlet flow aperture 183 extends through the end cap 166 from the first inner margin 178 to the underside of the end cap 166. A plurality of radially ribs 181 are formed on the underside of the end cap 166.

The filtration assembly 152 is the second subcomponent of the cartridge assembly 14. The filtration assembly 152 has, in order of assembly, a top adhesive dam 184, a filter sleeve 186, a carbon filter 188, and a bottom adhesive dam 190.

The top adhesive dam 184 has a downward directed lip 192 that engages the outside upper margin of the filter sleeve 186. A central flow aperture 194 is defined through the top adhesive dam 184. Preferably, an adhesive bead 196 is positioned on the upper surface of the top adhesive dam 184 and a second adhesive bead 198 is positioned on the lower surface of the top adhesive dam 184.

The filter sleeve 186 is generally cylindrical in form having an outer margin 200 and an inner margin 204. As depicted in FIG. 9, the outer margin 200 of the filter sleeve 186 is spaced apart from the inner margin 205 of the barrel 154 to define a flow passage 202 therebetween. The inner margin 204 of the filter sleeve defines an axial bore that extends through the filter sleeve 186.

The carbon filter 188 is disposable within the bore defined in the filter sleeve 186. Accordingly, the outer margin 206 of the carbon filter 188 is slightly less in diameter than the diameter of the inner margin 204 of the filter sleeve 186. As previously indicated, having the filter sleeve 186 and the carbon filter 188 being separate disengageable components provides for a great deal of flexibility in selecting manufacturers for the filter sleeve 186 and the carbon filter 188. Additionally, a specific carbon filter 188 may be provided with a plurality of different filter sleeves 186 each having different material compositions. Such different filter sleeves 186 can accommodate a variety of different impurities anticipated to be found in the water to be filtered. In a preferred embodiment, the filter sleeve 186 is formed of melt blown polypropylene. An advantage of the filter sleeve 186 is that it acts as a prefilter to carbon filter 188 and extends the life of the carbon filter 188. Preferably, the carbon filter 188 is of sufficiently small porosity to filter out oocysts such Ghirardia. It is known that the Ghirardia oocyst is approximately three to four microns in diameter. In addition to the aforementioned polypropylene material, suitable sleeve materials for forming the filter sleeve 186 include borosilicate glass, Teflon, polyester, melt blown polypropylene sheet captured in netting, reticulated foam, cation and anion exchange fibrous media (the media could also be iodinated).

The carbon filter 188 is preferably made of activated carbon and is of one micron size. The carbon block forming the carbon filter 188 has an inner margin 208 that defines an axial bore 210.

The bottom adhesive dam 190 has a central circular step 212 therein. The step 212 is designed to fit within the confines of the inner margin 208 of the carbon filter 188. The outer margin of the bottom adhesive dam 190 comprises a beveled peripheral margin 214. The beveled peripheral margin 214 conforms to the radiused inner surface 157 of the rounded end 156. In a preferred embodiment, an adhesive bead 216 is disposed on the upper surface of the bottom adhesive dam 190.

Referring to FIG. 10, front and rear graphics 220 are shown adherable to the outer surface of the barrel 154. The center of the graphics 220 are aligned with the groove 164. When the end cap 166 is mated to the barrel 154, the tongues 168 of the end cap 166 must be aligned with the grooves 164 of the barrel 154. Owing to the fact that the two shoulders 174 can engage the inward directed lugs 40 of the peripheral ring 34 in only one of two ways, such engagement causes one of the two graphics 220 to always be displayed outward when the cartridge assembly 14 is engaged to the manifold assembly 12. In this manner, the tongues 168 cooperate with the grooves 164 to provide a positive means of aligning the graphics 220 such that one of the graphics 220 is presented to a user viewing the filter assembly 10 when the filter assembly 10 is coupled to the appliance.

The cartridge assembly 14 is assembled generally as depicted in FIG. 8. Once assembled, the various components comprising cartridge assembly 14 are disposed as indicated in FIG. 9. The adhesive bead 216 forms an adhesive, water impermeable seal sealing the bottom of the adhesive dam 190 to both the filter sleeve 186 and the carbon filter 188. Likewise, the adhesive bead 198 forms an adhesive, water impermeable seal between the top adhesive dam 184 and both the filter sleeve 186 and the carbon filter 188. The underside margin of the radial ribs 181 of the end cap 166 are adhesively coupled to the top adhesive dam 184 by the adhesive bead 196. Since only the radial ribs 181 are adhered to the top adhesive dam 184, flow passageways are defined between the end cap 166 and the top adhesive dam 184 as indicated at 222. The flow passage 222 fluidly couples the inlet flow aperture 183 and the flow passage 202, such that unfiltered water entering the cartridge assembly 14 flows radially outward to the flow passage 202.

In operation, a user first rotates the bypass cap 18 to free the bypass cap 18 from the manifold assembly 12. This closes the valve 90. The manifold assembly 12 then is ready for mating of the filter cartridge 14 to the manifold assembly 12. This is accomplished by positioning the shoulders 174 to rotatably engage the inward directed lugs 40. Rotation of the cartridge assembly 14 relative to the manifold assembly 12 causes the ramped bearing surfaces 176 of the shoulders 174 to engage the ramps 43 of the inward directed lugs 40. Continued rotation of the cartridge assembly 14 relative to the manifold assembly 12 acts to draw the cartridge upward into a firm engagement with the cartridge insert 50 by riding against the ramps 43 to engage the ramped bearing surfaces 42. Simultaneously, the bearing surface 95 of the valve 90 is depressed by riding up the ramp 182, thereby opening the valve 90.

Removal of the cartridge assembly 14 from the manifold assembly 12 requires rotating the cartridge assembly 14 in the opposite direction relative to the manifold assembly 12. Initially, such rotation results in the spring 96 biasing the high flow valve 90 into the closed disposition such that once the cartridge assembly is disengaged from the manifold assembly 12, no water from the tap flows through the manifold assembly 12. While the seal 126 is still in sealing engagement, subsequent rotation causes the kick off ramps 44 to engage the kick off surface 177 of the cartridge assembly 14. Further rotation of the cartridge assembly 14 relative to the manifold assembly 12 causes the cartridge assembly 14 to ride up the kick off ramps 44, thereby slowly withdrawing the cartridge insert 50 from the end cap 66 of the housing assembly 150 of the cartridge assembly 14. Such rotation simultaneously acts to disengage the valve ramp 182 from the bearing surface 95 of the high flow valve 90.

When the cartridge assembly 14 is engaged with the manifold assembly 12, the path of flow of water is as follows: incoming water from a source such as a tap flows through inlet barbed tube 52a through inlet fluid port 45a, through fluid inlet 86 around the high flow valve 90, and through the inlet bore 106. Once the water has passed from the inlet bore 106, the water flows through the inlet flow aperture 183 and the flow passage 222 to the flow passage 202. The water then passes through first the filter sleeve 186 and then the carbon filter 188 where certain impurities are filtered from the water. Filtered water passes through the bore 210 and the outlet axial bore 112 to the lateral fluid outlet 110 and then out through the outlet fluid port 46b to the outlet barbed tube 52b.

Figure 13:
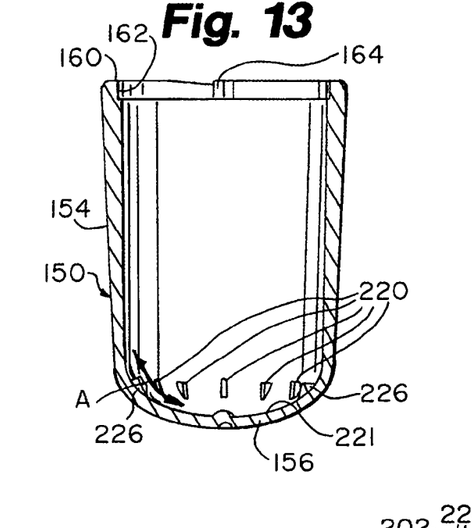
FIG. 13 is a sectional view of an alternative embodiment of the housing assembly of the cartridge assembly.
Figure 14:
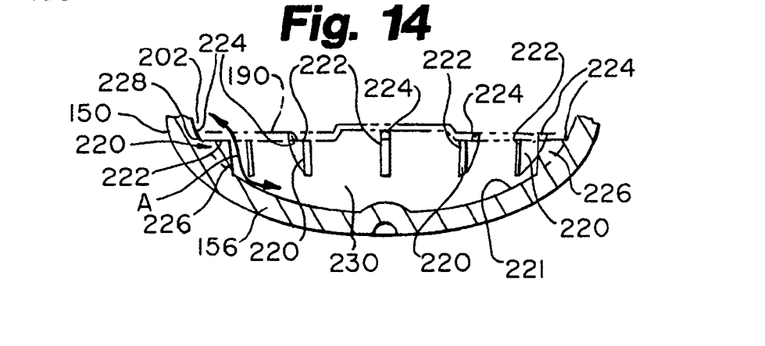
FIG. 14 is an enlarged sectional view of the lower portion of the housing assembly of the cartridge assembly of FIG. 13 including the glue dam depicted in phantom.

A preferred embodiment of the housing assembly 150 is depicted in FIGS. 13 and 14. The housing assembly has a plurality of supports 220 formed on the inner margin 221 of the rounded end 156. The supports are preferably space equiangularly around the rounded end 156. The supports have an upper margin 222 that is generally flat and is designed to support the bottom adhesive dam 190, depicted in phantom in FIG. 14. A beveled margin 224 extends generally upward from the upper margin 222 outward to the intersection of the support 220 with the inner margin of the rounded end 156. The bottom adhesive dam 190 has an outer margin 228 defining a circumference that is about equal to covering the upper margin 222, but not so great as to extend over the beveled margin 224. Accordingly, a flow passage 226 is defined between the outer margin 228 of the bottom adhesive dam 190, substantially the full circumference of the bottom adhesive dam 190 except where the bottom adhesive dam 190 is supported by the supports 220. The flow passage 226 fluidly connects the flow passage 202 to the chamber 230 defined below the bottom adhesive dam 190 as indicated by the flow arrow A. Such flow ensures that the pressure in the bore 210 and in the flow passage 202 are equalized and prevents bowing and possible rupture of the bottom adhesive dam 190. It should be noted that there is no flow between the unfiltered water in the chamber 230 and the bore 210 without passage through the filter sleeve 186 and the carbon filter 188 via flow passage 202.

What is claimed is:

1. A filter assembly for filtering water from an external source, the filter assembly including a non-metallic manifold assembly mountable to an appliance and being in fluid communication with the external source and a cartridge assembly, the cartridge assembly being replaceably fluidly couplable to the manifold assembly, the filter assembly further comprising:
   at least one valve disposed in the manifold assembly operable to affect the rate of water flow from the external source having a fluted shaft, the at least one valve having a valve head coupled to the fluted shaft, the fluted shaft having a plurality of flutes being defined between a plurality of spaced apart flute walls, the flutes defining flow passages around the valve and extending in a first direction from the valve head, a single valve seat, and a compressible spring acting on the head and disposed relative to the valve head in a second direction, the second direction being opposed to the first direction to bias the valve in a closed disposition, the valve being biased in a closed disposition by the spring.

2. The filter assembly of claim 1, the valve being disposable in a valve well and the flute walls presenting a flute wall outer margin, the outer margin bearing on the valve well for maintaining the valve in a substantially axial alignment with a valve well longitudinal axis.

3. The filter assembly of claim 2 wherein fluid under pressure from the external source acts in cooperation with the compressible spring to bias the valve in the closed disposition.

4. The filter assembly of claim 2 wherein the flute wall outer margin has a constant width, tapered at a distal end, the distal end defining a bearing surface, a force exerted on the boaring surface acting to shift the valve from the closed disposition to an open disposition.

5. The filter assembly of claim 2 further including the valve head having a circumferential seal for forming a sealing arrangement with the valve seat defined in the valve well.

6. The filter assembly of claim 5 wherein the circumferential seal is formed of an elastomeric material overmolded on the valve head.

7. The filter assembly of claim 6 wherein the valve head tapers to the fluted shaft to define an efficient flow path around the valve.

* * * * *

UNITED STATES PATENT AND TRADEMARK OFFICE
CERTIFICATE OF CORRECTION

PATENT NO. : 6,953,526 B1 Page 1 of 1
APPLICATION NO. : 09/618686
DATED : October 11, 2005
INVENTOR(S) : Karl Fritze It is certified that error appears in the above-identified patent and that said Letters Patent is hereby corrected as shown below:

Column 1
Line 49, delete "constrictions" and insert -- constructions --, therefor.

Column 3
Line 65, delete "hearing" and insert -- bearing --, therefor.

Column 6
Line 56, delete "1118" and insert -- 118 --, therefor.
Line 65, delete "1118" and insert -- 118 --, therefor.

Column 12
Line 1, in claim 4, delete "boaring" and insert -- bearing --, therefor.

Signed and Sealed this

Eleventh Day of November, 2008

JON W. DUDAS
*Director of the United States Patent and Trademark Office*